United States Patent [19]

Murray et al.

[11] Patent Number: 5,023,851

[45] Date of Patent: Jun. 11, 1991

[54] METHOD FOR PRESENTING ELECTRONIC CALENDAR INFORMATION IN AN INTERACTIVE INFORMATION HANDLING SYSTEM

[75] Inventors: Donna F. Murray, Euless; Joseph M. Pringle, Irving; Gerald C. Strope, Grapevine, all of Tex.; Stephen P. Berkson, Toronto, Canada

[73] Assignee: IBM Corp., Armonk, N.Y.

[21] Appl. No.: 178,725

[22] Filed: Apr. 6, 1988

[51] Int. Cl.$^5$ .............................................. G04B 45/00
[52] U.S. Cl. ........................................ 368/41; 368/28
[58] Field of Search ..................................... 368/28, 41

[56] References Cited

U.S. PATENT DOCUMENTS

| | | | |
|---|---|---|---|
| 4,162,610 | 7/1979 | Levine | 368/41 |
| 4,361,874 | 11/1982 | Yashuda | 368/28 |
| 4,591,840 | 5/1986 | Curtis et al. | 340/706 |
| 4,626,836 | 12/1986 | Curtis et al. | 340/706 |
| 4,645,238 | 2/1987 | Vincent et al. | 340/700 |
| 4,881,179 | 11/1989 | Vincent | 368/41 |

OTHER PUBLICATIONS

Reflex: The Analyst 3rd Edition, pp. 38, 39, Borland-/Analytica Inc., 1987.

Library Brochure, 1987, Word Perfect Corporation, Bren LBO1/1.1-9/87.

*Primary Examiner*—Bernard Roskoski
*Attorney, Agent, or Firm*—Richard E. Cummins; James H. Barksdale

[57] ABSTRACT

A method of simultaneously displaying day calendar information in first and second view ports, each of which displays it's calendar data in a different format. The information in the two simultaneously displayed view ports is functionally interrelated to provide an improved interactive user interface.

The first viewport has a time structured format which displays a sequence of predesignated time slots, each of which represents a fixed period of time, such as 30 minutes. Each time slot is allocated to one display line in the viewport. If the number of time slots allocated between the beginning and end of a calendar day is greater than the number of display lines in the viewport, then the information is scrollable so that the entire day may be viewed by the operator. The first viewport also includes at least one column that is used to display a vertical busy bar adjacent to a time slot which indicates that the slot is already scheduled.

The second viewport is used to enter the start time and end time of an event being calendared along with a free form text description of the event that is being calendared. The description is not limited in length or tied to the time period of the event. The length of the description is therefore independent of the number of display lines representing the overall time period of the event since there are no pre-established time slots in the second viewport.

The information in the two viewports is interrelated in that the start time and end time of each event calendared in the second viewport is used to establish the busy bars in the first viewport.

11 Claims, 5 Drawing Sheets

```
34                    DAY CALENDAR
31  VIEW  MOVE  COPY  ADD  DELETE  CALENDAR  FIND  PROOF  PRINT  EXIT
27       DATE  FEB. 29 88    CALENDAR FOR I.M. USER
                        CMD START   END   SEC        DESCRIPTION        49
      8:00am         39  9:00am 10:00am  51Meeting with Don Smith about E3
      8:30am 42                              Editor. His office.
38    9:00am           10:00am 12:00n    Department meeting to update mem-
      9:30am                              bers on the move to new offices
      10:00am                             and general update on work status.
      10:30am 43      11:00am 12:30pm   Design Group Review          Th
      11:00am                             6F13
      11:30am                             This meeting is to review the work
      12:00n    Th  41                    thats been going on for our 60 day
      12:30pm                             work effort. Bring accomplishments
      1:00pm       40     47      48     and concerns. Only 10 more days to
      1:30pm                              go. For some that's good, for
      2:00pm                              others well .....
      2:30pm 45       50                  Please don't forget to keep your
      3:00pm                              people updated for this meeting
      3:30pm                              and the results from it.

33   MESSAGE AND PROMPT AREA

32    F1=HELP   F3=CANCEL   F7=PREV DAY   F8=NEXT DAY   F10=EXIT
```

FIG. 1

MAIN MENU

| PRINT | DIR | CHANGE_DIR | PROFILE |

34
31
27

1. MAIL
2. LIBRARY
3. PHONE DIRECTORY
4. CALENDAR — 35
5. SPREADSHEET
6. WORDPROCESSOR

33 ENTER A SELECTION

32  F1=HELP        F10=EXIT

FIG. 2

DAY CALENDAR

| VIEW | MOVE | COPY | ADD | DELETE | CALENDAR | FIND | PROOF | PRINT | EXIT |

DATE FEB. 29 88   CALENDAR FOR I.M. USER
CMD START   END SEC   DESCRIPTION  49

```
8:00am                9:00am 10:00am 51 Meeting with Don Smith about E3
8:30am  42                              Editor. His office.
9:00am                10:00am 12:00n   Department meeting to update mem-
9:30am                                 bers on the move to new offices
10:00am  43                            and general update on work status.
10:30am               11:00am 12:30pm  Design Group Review
11:00am                                6F13
11:30am  Th                            This meeting is to review the work
12:00n                                 thats been going on for our 60 day
12:30pm                                work effort. Bring accomplishments
1:00pm                47        48     and concerns. Only 10 more days to
1:30pm                                 go. For some that's good, for
2:00pm                                 others well ......
2:30pm  45                             Please don't forget to keep your
3:00pm                                 people updated for this meeting
3:30pm                                 and the results from it.
```

39  41  40  50

MESSAGE AND PROMPT AREA

F1=HELP    F3=CANCEL    F7=PREV DAY    F8=NEXT DAY    F10=EXIT

FIG. 3

DAY CALENDAR 62

VIEW MOVE COPY ADD DELETE CALENDAR FIND PROOF PRINT EXIT

DATE FEB. 29 88    CALENDAR FOR I.M. USER
                   CMD  START    END    SEC    DESCRIPTION

2:00am  3:00pm       Work group meeting 07-F13 to dis-
                                        cus patent coverage of project.
                   4:00pm  5:00pm       Finish weekly report.
                                        51

8:00am
8:30am
9:00am
9:30am
10:00am
10:30am
11:00am
11:30am
12:00n
12:30pm
1:00pm
1:30pm
44---> 2:00pm
2:30pm
3:00pm
3:30pm

MESSAGE AND PROMPT AREA

F1=HELP   F3=CANCEL   F7=PREV DAY   F8=NEXT DAY   F10=EXIT

FIG. 4

| DATE | CALENDAR | | START TIME | END TIME | SEC-UR'Y | EVENT DESCRIPTION |
| | NAME | USER | | | | |
|---|---|---|---|---|---|---|
| 022988 | MAIN | USER IMA | 9:00am | 10:00am | | Meeting with Don Smith about E3 Editor. His office. |
| 022988 | MAIN | USER IMA | 10:00am | 12:00n | | Department meeting to update members on the move to new offices and general update on work status |
| 022988 | MAIN | USER IMA | 11:00am | 12:30pm | | Design Group Review 6F13 This meeting is to review the work thats been going on for our 60 day work effort. Bring accomplishments and concerns. Only 10 more days to go. For some that's good, for others well ..... Please don't forget to keep your people updated for this meeting and the results from it. |

FIG. 5

METHOD FOR PRESENTING ELECTRONIC CALENDAR INFORMATION IN AN INTERACTIVE INFORMATION HANDLING SYSTEM

FIELD OF THE INVENTION

This invention relates in general to electronic calendaring methods and in particular to a method of simultaneously displaying calendar information in two different interrelated formats.

BACKGROUND ART

The prior art has disclosed a number and variety of interactive electronic calendaring systems and methods. The objective of all of these systems is primarily to assist the person who, for a number of different reasons, maintains a calendar of future events containing various information about the event at entry points on the calendar which relate to the time of the event.

The increase of personal computers and intelligent workstations in recent years has made it possible for calendar owners to establish and maintain their calendars on these interactive type data processing systems.

Two general types of interactive electronic calendaring systems have thus evolved in the art. In one type of calendaring system, the owner of the calendar is generally also the user of the workstation and that workstation is generally not a part of a larger network. Generally, in these types of systems, the calendar functions involve presenting a screen to the user representing a day calendar divided into a number of time periods or time slots. Each period is capable of displaying a limited amount of text that the user enters. In some systems, the day calendar can scroll vertically to present more time periods to the user or horizontally to present longer text entries. The operator can generally "page" forward or backward and, in most arrangements, can display a requested date. These calendaring arrangements generally do not limit the type of event that is calendared nor the terminology employed at any of the entry points and, to that extent, function in the same manner as conventional manual calendars or appointment books. The electronic calendaring method and systems do have an advantage over the prior art manual calendaring of events in that the user generally has the ability to scan a time span involving a large number of days and identify calendared events quite rapidly. U.S. Pat. Nos. 4,645,238, 4,591,840 and 4,626,836 describe representative prior art methods and systems involving electronic type calendar arrangements.

The other type of calendaring arrangement that has developed in the prior art involves multi-user environments having a large number of terminals or workstations which are generally part of a larger communication network that has been established to permit the users to interact with each other and with data maintained on the data processing system. In this environment, a user at a terminal or workstation can send a message to one or more of the other users on the network and is notified when the addresses has received and read the message.

In both of the above environments there are two general formats employed for displaying calendar data related to a particular day. The first day calendar format comprises a plurality of time slots which are specifically identified as such on the screen. In this time structured format the length of the time slot period for a particular application is fixed. In one application the time slot period may be fixed at 15 minutes. In another application the time slot period may be fixed at 30 minutes. Similarly the starting time and ending time for the day being displayed are generally pre-established in particular applications but different applications will have different starting and ending times for the calendar days. For example in one application the day calendar may cover 24 hours, i.e., 12:00 midnight to 11:59 p.m. In another application the day calendar will cover only 12 hours, i.e., from 6:00 a.m. to 6:00 p.m.

Since most display screens of interactive terminals are limited to generally 80 columns of text per line and approximately 20 lines of text, most calendar applications cannot display, on one screen, the entire period representing one complete day of calendared events. As a result the day calendar is allowed to scroll vertically between the starting time slot and the ending time slot. As a result the user generally cannot determine what free time is available merely by a quick glance at the calendar screen. The calendar must be scrolled. In a scenario where the user is attempting to determine what day is available for a three hour meeting in the late afternoon, he must page through each day calendar and when the calendar has to be scrolled to see the late afternoon time slots, considerable time can be involved.

In addition, in most applications, since the descriptive area is generally limited to one line to permit a larger number of time slots to be displayed, the description of the event is generally very cryptic. While some applications allow for horizontal scrolling to permit less cryptic descriptions of calendar events to be entered, the general consensus in the art is that such an approach merely confuses the operator and while it may alleviate the problem of cryptic descriptions, it creates other problems of the same nature and magnitude.

The second format employed in some electronic calendaring methods does not structure the number of descriptive lines allocated to a time slot or a calendar event. In this later format, the operator enters the start time and the end time of the event in prescribed areas on the first line and then can enter as much text as necessary (within reason) to describe the event plus any comments, reminders, or directions that are appropriate. The next event is calendared before or after the first event depending on the time of the event and is also allowed as many lines as is necessary to describe that event. The main advantage of this second format is that the user feels less constrained and generally is not faced with the problem of deciphering some cryptic entry that was made a month earlier. In environments where a user is permitted to use another persons calendar, a higher level of understanding of the events that are calendared is also achieved.

There are of course some disadvantages because if there are a number of entries for the day, the available free time is not that readily discernible, but requires a rather concentrated scan of the starting and ending times of each entry to determine the length of free time that might be available between calendar units. Considerable more vertical scrolling time may also be involved depending on the number of events calendared and the levels at which they are described.

Users of electronic calendaring systems generally favor one system or the other and quite often management is reluctant to change from one format to the other, even though a newer electronic calendaring system having considerable added function, may be available. The trauma for some users involved in the change of formatting approaches might discourage some from participating in the system.

The present invention is directed to a method of displaying to the user, calendar information in a manner that maintains the advantages of both formats so that prior users of either prior art format need not change their way of calendaring data but gain added advantages and functions over earlier prior art methods with which they are familiar.

SUMMARY OF THE INVENTION

In accordance with the method of the present invention a day calendar display screen is built which comprises first and second view ports, each of which displays a calendar day in a different format. The information in the two simultaneously displayed view ports is functionally interrelated to provide an improved interactive user interface.

The first viewport displays a sequence of predesignated time slots, each of which represents a fixed period of time such as 30 minutes. Each time slot is allocated to one display line in the viewport. If the number of time slots allocated between the beginning and end of a calendar day is greater than the number of display lines in the viewport, then the information is scrollable so that the entire day may be viewed by the operator. Normally, with 30 minute time slots and an 8 hour work day it is possible to display one full work day at a time when each display line contains one time slot. In certain display technologies, a smaller than normal character set may be employed so that more lines are available on the screen to accommodate more time slots. The user does have the choice of setting the time span or time periord of the time slot.

The first viewport also includes at least one column that is used to display a bar next to each time slot that has a scheduled event. The first viewport in the preferred embodiment occupies, for example the first 20 columns of an 80 column screen. The second viewport comprises the remaining 60 columns and is used to display the Start time and End times of events that have been calendared along with a free text description of each event that is calendared. The number of text lines used for the event description in the second viewport is independent of the number of time slot lines used to represent the time span of the related event in the first viewport The information in the two viewports is interrelated in that the Start time and End time of each event calendared in the second viewport is used to establish a busy bar adjacent the corresponding time slot(s) of the first viewport. The information in the second viewport is also scrollable automatically in response to the user selecting a time slot displayed in the first viewport. For example, to see the description of the event calendared at 2:00 pm, the user points to the 2:00 pm time slot in the first viewport with the cursor, and clicks the mouse which causes the second viewport to scroll so as to position the 2:00 pm event description at the top of the second viewport. Prior art selection techniques other than a mouse may also be employed.

In the preferred embodiment, each new event that is calendared is initially entered after the last entry in the descriptive area regardless of the start time of the event. After the new event is entered into the system in response to the user pressing the Enter key, the events are sorted by Start times and displayed in chronological Start time order. If desired the viewports may be functionally interrelated to permit the user to select a time slot in the first viewport for the entry of a new event description. In this approach the second viewport is automatically scrolled to position one or more blank lines at the top of the screen so the new entry is will be in the correct time slot sequence.

The composite display of both formats simultaneously with the described interaction provides all of the advantages of the separate prior art calendaring displays.

It is therefore an object of the present invention to provide an improved electronic calendaring method for interactive display terminals.

Another object of the present invention is to provide an improved method for displaying day calendar information on the screen of an interactive terminal.

A further object of the present invention is to provide a method for simultaneously displaying day calendar information in two different formats which allow calendar data entered into one format to be reflected in the other format.

A still further object of the present invention is to provide an improved method for displaying a day calendar in an electronic calendaring system so that all of the time slots comprising the work day are displayed at the same time on one portion of the screen and for each time slot that is reserved, a variable length busy bar is displayed and in another area of the screen a variable length description for the corresponding event is provided.

Objects and advantages other than those described above will become apparent from the following description of a preferred embodiment when read in connection with the drawing.

DESCRIPTION OF THE PREFERRED EMBODIMENT

Figure 1:
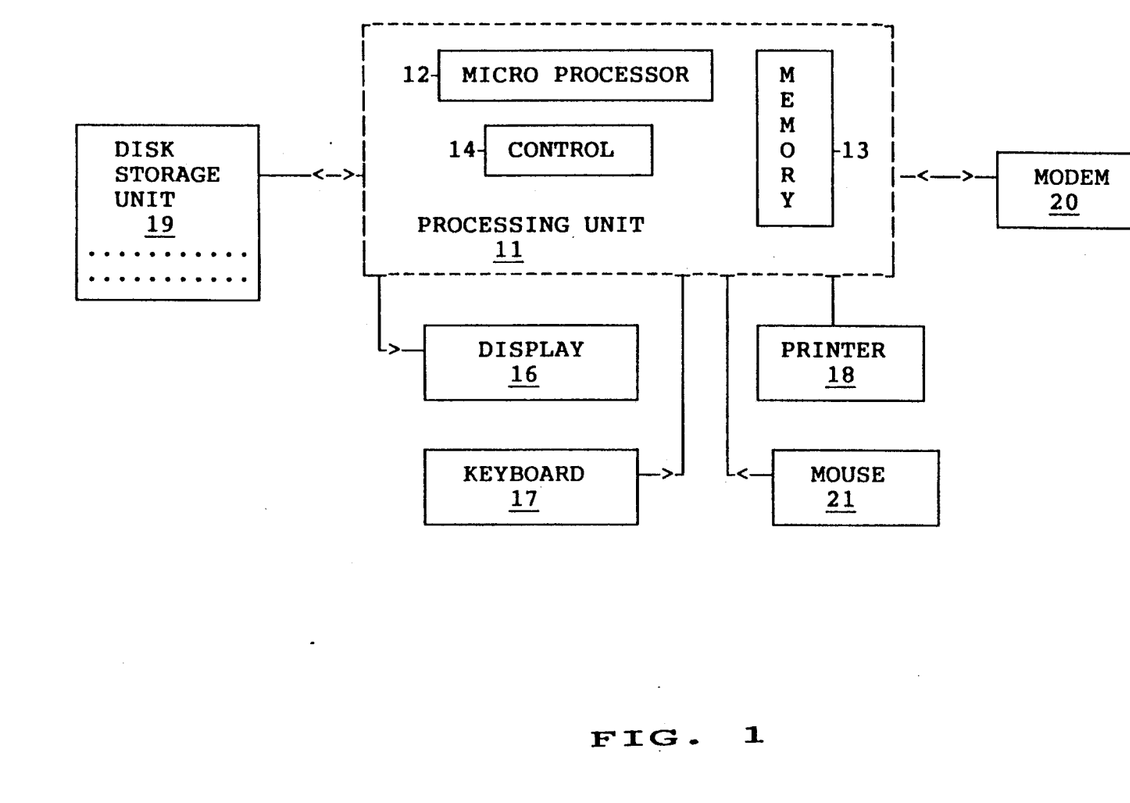
FIG. 1 is a functional block diagram of a terminal of an interactive information handling system in which the method of the present invention may be advantageously employed.

FIG. 1 illustrates the functional components of an interactive type data processing terminal on which the electronic calendaring method of the present invention may be advantageously employed. The terminal comprises a processing unit 11 which includes a microprocessor block 12, a semiconductor memory 13, and a control block 14 which functions to control input/output operations in addition to the interaction between the micro processor block 12 and the memory unit 13.

The terminal further includes a group of conventional peripheral units including a display device 16, a keyboard 17, a printer 18, a disk storage unit 19, and a modem 20. Since the details of the above-described functional blocks form no part of the present invention and can be found in the prior art, only a brief functional description of each block is set forth, along with a description of their interactions, sufficient to provide a person of ordinary skill in the art with a basis of understanding applicants' improved electronic calendaring method.

Processing unit 11 corresponds to the "system unit" of a personal computer system such as the IBM XT, IBM AT or PS/2 type systems. Unit 11 is provided with an operating system program which may be one of the many versions of DOS (Disk Operating System) which is normally employed to run the systems. The operating system program is stored in memory 13 along with one or more application programs that the user has selected to run. Depending on the capacity of memory 13 and the size of the application programs, portions of these programs, as needed, may be transferred to memory 13 from the disk storage unit 19 which may include, for example, a 30 megabyte hard disk drive and a diskette drive. The basic function of the disk storage unit is to store programs and data that are employed by the system and which may readily be transferred to the memory unit 13 when needed. The function of the diskette drive is to provide a removable storage function for entering programs and data into the system, and a vehicle for storing data in a form that is readily transportable for use on other terminals or systems.

Display device 16 and keyboard 17 together provide for the interactive nature of the terminal, in that in normal operation, the interpretation that the system gives to a specific keystroke by the operator depends, in substantially all situations, on what is being displayed to the operator at that point in time.

In some situations, the operator, by entering commands into the system, causes the system to perform a certain function. In other situations, the system requests the entry of certain data, generally by displaying a prompt type of menu/message screen. The depth of the interaction between the operator and the system varies by the type of operating system and the application program, but is a necessary characteristic of terminals on which the method of the present invention may be employed.

The terminal shown in FIG. 1 further includes a printer 18, which functions to provide hard copy output of data developed or stored in the terminal. The modem 20 functions to transfer data from the terminal of FIG. 1 to a host system through one or more communication links which may be a commercial type link or a dedicated communication link. Lastly, a mouse 21 is provided to select items that are displayed by moving a selecting cursor that is displayed on the screen and is positionable by the mouse.

Figure 2:
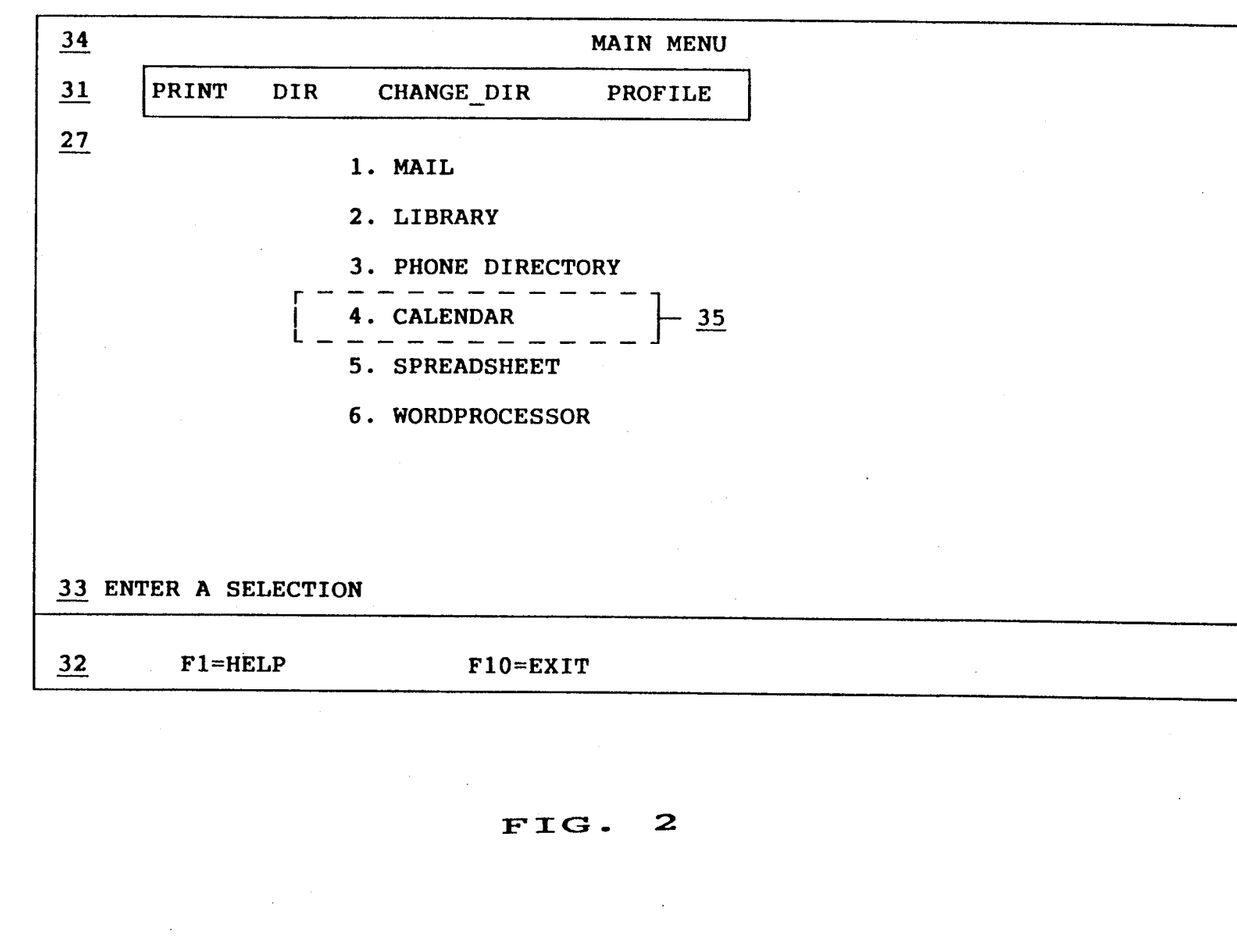
FIG. 2 illustrates the main menu display screen of the interactive terminal shown in FIG. 1.

FIG. 2 is representative of the display panel that is presented to the user/operator immediately after the terminal is initialized. The content of this display screen is merely an example of the type of options that might be presented to the terminal user, and the overall functional areas of the screen which remain constant and are considered part of the user interface of the system.

It is assumed that the personal computer is provided with a display management system which uses a command bar for the selection of actions and a vertical scroll bar function which allows selected display screens to be scrollable under the control of a mouse.

The command bar portion of the screen shown in FIG. 2 is designated by referenced character 31. The commands that are shown for the panel are merely representative. The specific commands that are displayed on the command bar will vary depending on the information being displayed and the point in the task that is being performed. The user interface screen also includes a function key area 32 which allows the operator to request predetermined tasks or actions. Generally the task assigned to a function key does not vary within a given application program or operating system. Some function keys have obtained a defacto standard such as function key F1 which is generally used to request the display of a "help" panel. A message area designated 33 is provided to display prompts or error messages from the system to the operator.

The top line 34 of the screen is used to designate the name of the application program and/or the screen name. In a multi-tasking system, an area may also be provided to indicate other tasks that are presently active which have been open and are executing in a background mode.

The main display area of the screen is designated 27 and as such is shown in FIG. 2 with a number of tasks which are selectable. For example, moving the cursor vertically to each line, which causes the task to be highlighted, and pressing the enter key, causes the highlighted task to be selected. Other selection techniques described in the prior art may also be employed.

It is assumed for purposes of this description that the operator has just initialized the system and that the "Calendar" option 35 is selected. The screen shown in FIG. 3 is then displayed.

Figure 3:
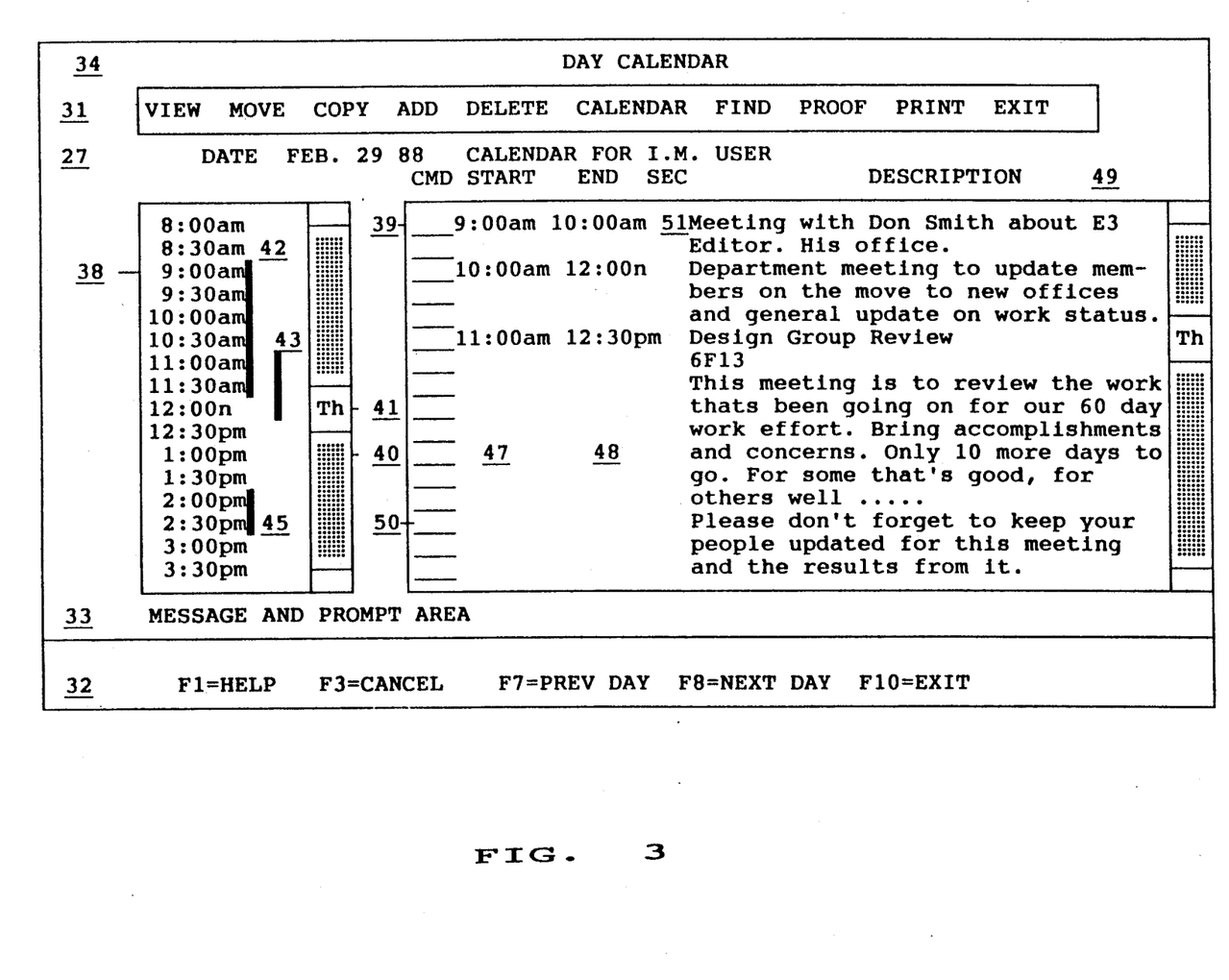
FIG. 3 illustrates the display screen presented in response to the user selecting the Calendar function on the screen of FIG. 2.

The screen shown in FIG. 3 comprises a pair of separate but functionally interrelated viewports or windows 38 and 39. Area 38 has a time structured format in which each display line represents a fixed time period. The area or space between a pair of horizontally adjacent lines is allocated to one time slot. As shown, each line or space between adjacent horizontal line represents a 30 minute time period or time slot. The height of the viewport 38 as shown, is 16 time slots. The viewport therefore covers an eight hour period. Time slots prior to 8:00 a.m. and after 3:30 p.m. may be provided, if desired, in which case the information is scrollable to bring these time slots into view. In the preferred embodiment a vertical scroll bar 40, including a "thumb", "elevator" or "scroll box" 41, is provided at the right edge of the viewport to permit a scrolling operation employing mouse 21, which first selects the "thumb" with a mouse directed cursor and then drags the "thumb" up or down in a vertical direction by moving the mouse. This operation causes the time slots to scroll either up or down.

The third area 45 of the viewport is called the busy bar area. Its function is to map busy or committed time slots with a vertical busy bar which extends between the pair of horizontal lines that define the time slot. In practice, two separate busy bar columns 42, 43 are employed so that any potential scheduling conflicts can be indicated since the busy bars in each column will overlap for the conflict period in an horizontal direction. Other techniques, such as assigning a blinking attribute to the portion of the bar representing the conflict, may also be employed if horizontal space is at a premium.

Figure 4:
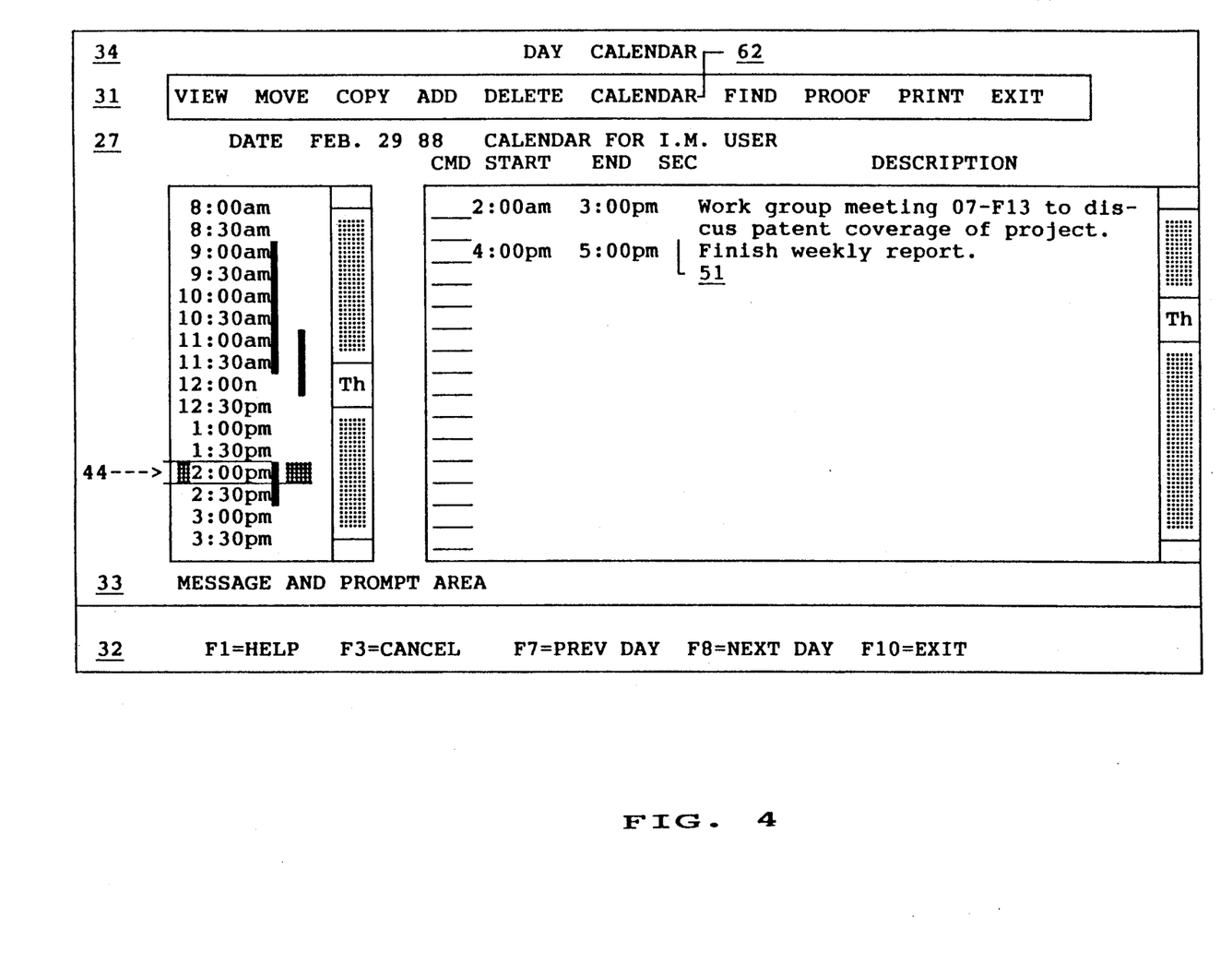
FIG. 4 illustrates the display screen of FIG. 3 after the descriptive panel has been automatically scrolled to the correct point in time to permit the description of the event to be viewed.

Viewport 38 is also provided with its own cursor shown as a reversed video box 44 in FIG. 4. The width of the viewport 38 is approximately 15 display columns as shown.

The second viewport 39 is called the descriptive area and includes a Start time column 47, an End time column 48, and a descriptive area 49. The function of area 39 is to display information in detail about a scheduled event. The Start time of the event is entered in area 47 while the End time of the event is entered in area 48 and the text describing the event in the area 49. Area 49 does not, in theory, limit the amount of text that can be entered although in practice some practical maximum restraint, like 15 lines, may be imposed. It is important to note, that the number of text lines consumed by the description, are independent of the number of lines allocated to the time period scheduled for the event. For example, a description of an event scheduled for one hour, may take ten lines and a description for an event scheduled for an eight hour period may take one line.

The event description area includes two additional columns. The first column 50 is the command column labeled CMD in the display and the column 51 labeled SEC which is for a security designation for that entry. Each entry can be given a security classification by entering an appropriate designation in column 51. The calendaring system would then permit each event description to be screened in accordance with some pre-established protocol.

The command column is employed to select the entry for some type of conventional text editing operation such as move, copy, delete, etc.

The busy bars shown in the time structured format area 38 of FIG. 3 are directly related to the start and end times of the events that are entered in the descriptive area. For example, when the 10:00 am event shown in FIG. 3 was entered into the system, the busy bar in column 43 was displayed. When the 11:00 a.m. entry was entered, a bar was displayed in the second column since there was a bar already in the first column. The fact that the entry was made in the second column and not the first, signifies that a scheduling conflict has occurred. The user can readily see the conflict since the bars in columns 42 and 43 overlap for the 11:00 am and 11:30 am time slots.

As shown in the drawing, a busy bar for a half-hour time slot begins at an imaginary horizontal line midway between the relevant displayed time and the immediately preceding displayed time. The bar ends at a similar horizontal line underneath the relevant displayed time.

FIG. 4 illustrates a screen that is presented to the user after the user has selected a time slot. In accordance with the method of the present invention, selection of a time slot for either an initial calendar entry or an editing action on the description of an event that was previously calendared, results in automatic scrolling of the information in the descriptive area to position the appropriate line at some predetermined location on the screen. For example, that predetermined location may be the top line of the screen or a line immediately adjacent the time slot. As shown in FIG. 4, positioning the highlighting cursor 44 on the two o'clock time slot in FIG. 4 and pressing the enter key, causes the information area to be scrolled and to place the 2:00 pm entry at the top of the descriptive area.

Figure 5:
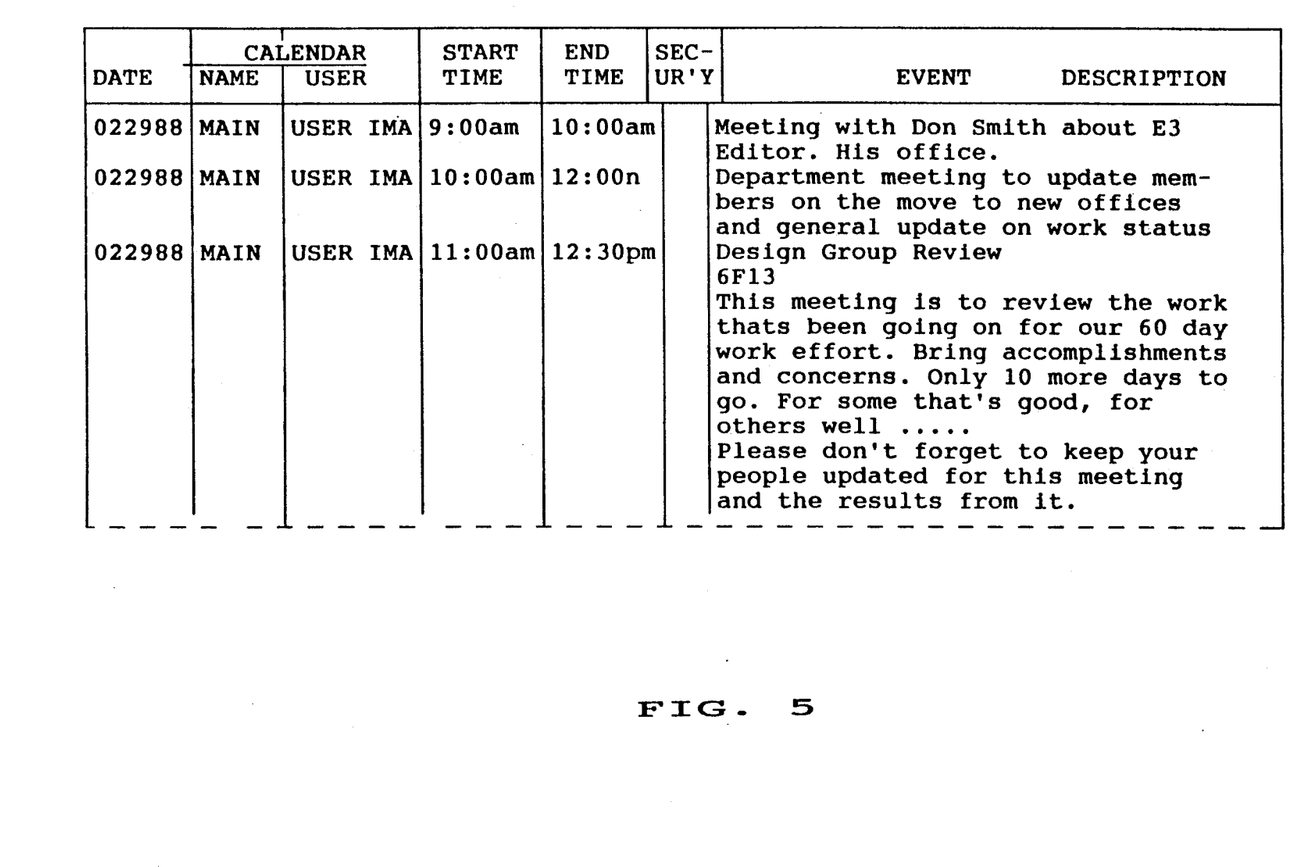
FIG. 5 illustrates the data structure for storing the calendaring information in the system.

FIG. 5 represents one form of data structure for storing the information that has been entered into the system for the calendared events. This data structure is employed to build the day screen. The time structured format shown in the viewport 38 is selected by the user. While the user's default selection as established in his profile will generally be employed at the time the system is IPLed, the selection may be modified at any time by appropriate action of the user in that the length of the work day can be increased and the time span or period of a time slot can be shortened or lengthened.

The busy time bars are mapped dynamically by a program that scans the data stored in the data structure shown in FIG. 5. A map similar to that shown in Table 1, below, is used to build the busy bar area of the screens of FIGS. 3 and 4. The rows of the map shown in Table 1. correspond to time slots that have been allocated in the time structured format of viewport 38. The columns designated 0 and 1, correspond to the two columns of busy bars shown in FIG. 3. As shown in Table 1, a third column may also be mapped if desired, since a column 2 is provided in the map.

TABLE 1

| | | COLUMNS | | |
|---|---|---|---|---|
| | | 42 | 43 | XX |
| | 0 | 0 | 0 | 0 |
| | 1 | 0 | 0 | 0 |
| | 2 | 1 | 0 | 0 |
| | 3 | 1 | 0 | 0 |
| | 4 | 1 | 0 | 0 |
| | 5 | 1 | 0 | 0 |
| | 6 | 1 | 1 | 0 |
| Time | 7 | 1 | 1 | 0 |
| Slots | 8 | 0 | 1 | 0 |
| | 9 | 0 | 0 | 0 |
| | 10 | 0 | 0 | 0 |
| | 11 | 0 | 0 | 0 |
| | 12 | 1 | 0 | 0 |
| | 13 | 1 | 0 | 0 |
| | 14 | 0 | 0 | 0 |
| | 15 | 0 | 0 | 0 |

The following pseudocode statements will be of interest to programmers in developing a program to create the busy bars.

```
MAIN ROUTINE
    CONVERT TIMES TO 24 HOUR VALUES
    SORT ENTRIES BY START TIME 1ST THEN END
    TIME
    CLEAR BAR POSITION MAP
    DO UNTIL ALL ENTRIES ARE DONE
        READ ENTRY START TIME AND END TIME
        CONVERT START AND END TIMES TO A BAR
        POSITION
        CHECK MAP FOR USE OF BAR POSITION
        DO WHILE BAR POSITION IN USE
            MOVE OVER 1 COLUMN POSITION
            CHECK BAR POSITION
        END DO WHILE
        CALL BAR ROUTINE WITH BAR POSITION
END OF DO UNTIL
BAR ROUTINE
    DRAW BAR
    MARK BAR POSITION MAP WITH LOCATIOM OF
    NEW BAR
```

An example of a busy bar position map for the screen of FIG. 3 is shown in Table 1. A 1 in column 0, at rows 2-7, and 12-13, and in column 1, rows 6-8 generates the busy bars shown in FIG. 3. This map is developed in accordance with the pseudo code listing set forth above and is used to build the busy bar section of the display that appears in viewport 38.

While a preferred embodiment of the present invention has been illustrated and described, it will be apparent that various modifications may be made therein without departing from the spirit of the invention or scope of the dependent claims.

We claim:

1. A method for an interactive computer display terminal which employs a calendar program for maintaining day calendar data for the operator of said terminal and for displaying selected day calendar screens in which each event is calendared for one or more sequential time slots pre-established interactively by said operator and said program, with multi-line descriptions of said calendared events displayed contiguously in a time ordered fashion, said method assisting said operator to more readily determine the busy or free status of a specified time period covering one or more of said time slots and the detail nature of an event that is calendared for a busy time slot spanned by said time period, said method comprising the steps of, (A) displaying at said terminal said selected day screen to illustrate for each calendared event, a start time, and end time and a description which can extend for a plurality of display lines,
 (B) concurrently displaying at said terminal a vertical time scale in which successive pairs of adjacent display lines represent said time slots for one calendar day, and having displayed times on selected said display lines to assist said operator in interpreting said scale, and
 (C) displaying a predetermined busy indicator adjacent each said time slot representation on said scale which has been calendared with an event to permit said operator to readily determine, (1) the status of a specific time slot merely by viewing said time scale, and (2) the details of an event when said specific time slot has said busy indicator displayed, by viewing the event description that is being concurrently displayed, said step of displaying a busy indicator further including the step of,
  (i) automatically creating said busy indicator with said calendar program based on said start time and said end time of said event calendared for said specific time slot.

2. The method recited in claim 1, in which said terminal includes a cursor positioning device for indicating to said system, the selection of displayed data including the further step of,
 (A) displaying a selection cursor that is movable to one selected said time slot in accordance with operation of said device.

3. The method recited in claim 2 in which said device is a mouse including the further steps of,
 (A) moving said mouse to position said selection cursor to one of said selectable time periods, and
 (b) clicking said mouse while said cursor is positioned on said one time period to select said one time period.

4. The method recited in claim 2 in which said step of displaying said busy indicator further includes the step of,
 (A) displaying a vertical rectangular busy bar adjacent said time slot to provide an indication that said time slot is busy, each said bar extending vertically between one said pair of display lines representing said busy time slot so that said busy bars in sequential said time periods are displayed contiguously to represent one continuous vertical line.

5. The method recited in claim 4, including the step of,
 (A) entering an event description into said terminal including the step of,
  (1) entering said start and end times of said event description at predetermined cursor locations in start time and end time columns respectively in said first window.

6. The method recited in claim 5 further including the step of,
 (A) creating with said calendar program at least one busy bar for display in said other window from data entered into said system during said step of entering an event description.

7. The method set forth in claim 6 further including the step of,
 (A) entering another event description into said system including the steps of,
  (1) positioning said cursor to a display line in said other window that corresponds to the start time of said another event description, and
  (2) automatically scrolling in response to operation of said device the information in said one window to automatically position at least one blank entry line in horizontal alignment with said display in said other window containing said cursor to facilitate the entry of said another event description.

8. The method set forth in claim 6 further including the step of,
 (A) modifying a previously entered event description including the steps of,
  (1) positioning said cursor to said time slot displayed in said other window that corresponds to the start time of said event to be modified, and
  (2) scrolling the information in said one window to automatically position the first line of said description of said event to be modified in horizontal alignment with said cursor to facilitate said step of modifying said previously entered event description.

9. A method to assist the operator of an interactive information handling system terminal, having a display screen which displays a predetermined number of display lines each of which has a predetermined number of character display positions, to readily determine (1) the busy status of a selected time period covering at least one of a plurality sequential time slots that have been established in a calendar application program by the interaction of said operator and said program, and (2) the detail nature of the event that causes said time slot to have a busy status, said method comprising the following sequential steps in combination,
 (A) dividing said display screen vertically into a pair of windows each having substantially the same number of display lines, each display line in one window of said pair having a substantially greater number of said character display positions than the corresponding display line in said other window of said pair,
 (B) displaying in said one window for a specific day, day calendar data maintained by said calendar program including the steps of,
  (i) displaying a start time for each event in one column,
  (ii) displaying an end time for each event in a second column, and
  (iii) displaying an event description for each event in a third column which description can extend for a plurality of display lines in said third column, said event descriptions for said specific day being displayed in order of said start times with said descriptions of two sequential events being displayed contiguously regardless of their respective said start times,
(C) displaying in said other window a vertical time scale in which each said time slot established by said calendar program is represented by the vertical space between two said display lines to permit substantially all of said time slots representing one calendar day to be displayed concurrently, including the further step of displaying near said scale specific times on selected display lines to assist said operator in readily interpreting said scale, and,
(D) displaying a busy indicator in a column adjacent said scale on said display line corresponding to a said time slot, when the time slot for said specific day has been calendared, including the further step of automatically generating each said busy indicator from said day calendar data, whereby said operator may readily determine by viewing said scale if a time period is busy or free, and if busy the detail nature of the event that is calendared by viewing the displayed description.

10. The method recited in claim 9, further including the step of,
(A) scrolling said data displayed in said other window independently of said data displayed in said one window to display additional said time slots in said sequence when said number of interactively established time slots exceeds said predetermined number of display lines.

11. The method recited in claim 10, further including the step of,
(A) displaying in said other window a second indication when one said time slot has been calendared with more than one event to signify a scheduling conflict for that one said time slot.

* * * * *